Feb. 6, 1951 P. VAN SITTERT ET AL 2,540,604
RIVET FEEDER
Filed May 28, 1945 4 Sheets-Sheet 1

INVENTORS
PAUL VAN SITTERT
MILTON J. GARRETT
JOHN H. ENGELN
BY Kwis, Hudson, Boughton & Williams
ATTORNEYS Feb. 6, 1951 P. VAN SITTERT ET AL 2,540,604
RIVET FEEDER
Filed May 28, 1945 4 Sheets-Sheet 2

INVENTORS
PAUL VAN SITTERT
MILTON J. GARRETT
BY JOHN H. ENGELN
Kwis, Hudson, Boughton & Williams
ATTORNEYS Feb. 6, 1951 P. VAN SITTERT ET AL 2,540,604
RIVET FEEDER
Filed May 28, 1945 4 Sheets-Sheet 3

INVENTORS
PAUL VAN SITTERT
MILTON J. GARRETT
BY JOHN H. ENGELN
Kwis, Hudson, Boughton & Williams
ATTORNEYS Feb. 6, 1951 P. VAN SITTERT ET AL 2,540,604
RIVET FEEDER
Filed May 28, 1945 4 Sheets-Sheet 4

INVENTORS
PAUL VAN SITTERT
MILTON J. GARRETT
JOHN H. ENGELN
BY
Kwis, Hudson, Boughton & Williams
ATTORNEYS Patented Feb. 6, 1951

2,540,604

UNITED STATES PATENT OFFICE 2,540,604

RIVET FEEDER

Paul Van Sittert, Shaker Heights, Milton J. Garrett, University Heights, and John H. Engeln, Cleveland, Ohio, assignors to The Cleveland Pneumatic Tool Company, Cleveland, Ohio, a corporation of Ohio Application May 28, 1945, Serial No. 596,375

1 Claim. (Cl. 10—162)

This invention relates to improvements in rivet feeders, more particularly means for assembling a column of rivets in a flexible tubular dispenser from which the rivets may be discharged one at a time into holes previously prepared in the work, and renewing the supply of rivets from time to time as circumstances require.

One of the objects of the invention is the provision of means of the character stated which shall function automatically to maintain the feeder loaded and ready for action.

Another object is the provision of means for taking rivets from a hopper and arranging them in a column with their stems or shanks all extending in a forward direction toward the delivery end of the apparatus.

Another object is the provision of means for maintaining fluid pressure behind a column of rivets for feeding them forcibly one at a time into the work.

Still another object is the provision of valve means for intermittently damming up the flow of rivets from the hopper until a quantity are collected, and thereafter letting them down as a column into a delivery tube, the valve means also functioning to control the flow of pressure fluid partly for operating the valve and partly for applying pressure behind the rivets in the delivery tube.

Other objects and features of novelty will appear as we proceed with the description of those embodiments of the invention which, for the purposes of the present application, we have illustrated in the accompanying drawings, in which Fig. 1 is an elevational view of the complete apparatus embodying the invention.

Figures 1, 6, 7:
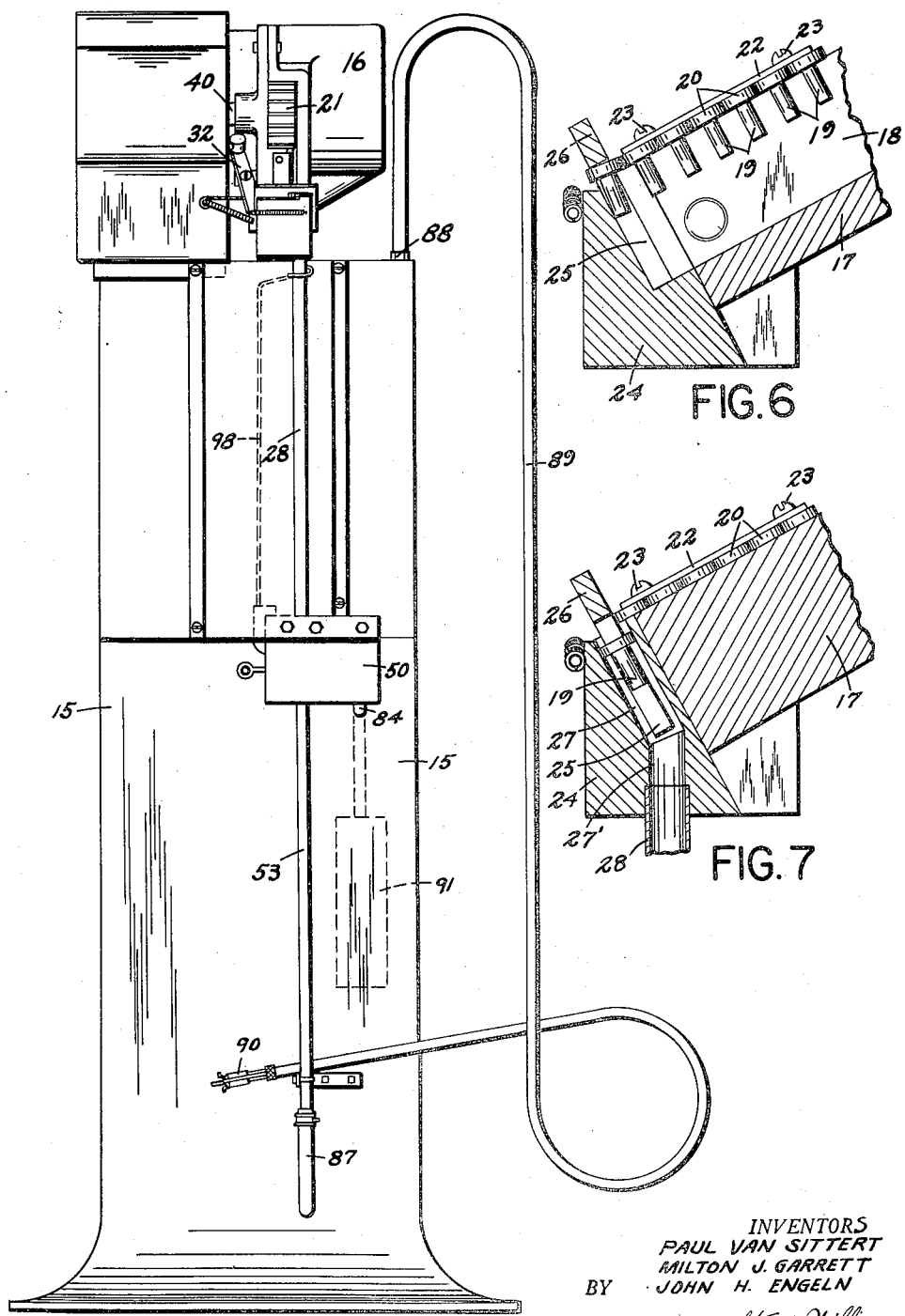
Fig. 6 is a fragmentary sectional view taken substantially on the line 6—6 of Fig. 3.
Fig. 7 is a similar view taken substantially on the line 7—7 of Fig. 4.
Figure 2:
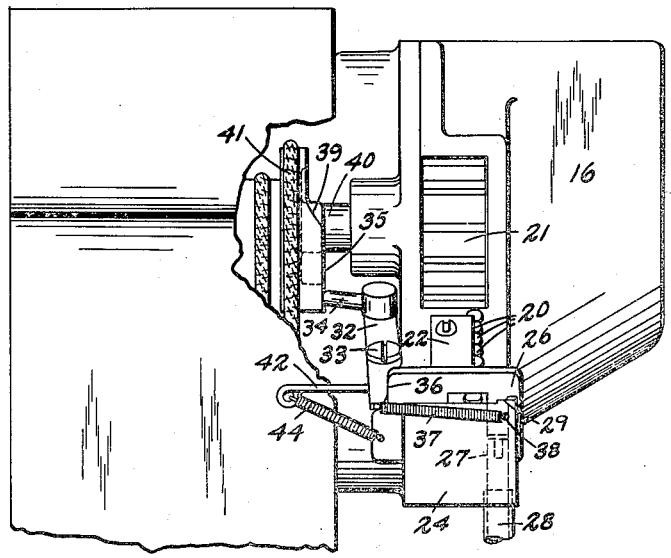
Fig. 2 is a fragmental elevational view on an enlarged scale illustrating the hopper and associated mechanism.

In the drawings we have shown at 15 a machine casing in which may be mounted an electric motor, an air compressor and other necessary apparatus not directly connected with the present invention. On the top of the casing there is supported a hopper 16 into which a considerable quantity of rivets may be dumped. The rivets may be of the type commonly used in airplane construction, having cylindrical stems or shanks and circular heads. Leading downwardly from the bottom of the hopper there is an inclined guide block 17 having a vertical slot 18 therein slightly wider than the diameter of the rivet shanks 19. These shanks find their way into slot 18, while the circular heads 20 of the rivets rest against the upper surface of the guide block. Rivets that collect on the top of the guide but do not have their shanks extending into the slot are pushed back by a ribbed rubber wheel 21. A flat plate 22 is secured by screws 23 to the guide block somewhat to one side of the slot 18, being spaced from the upper surface of the block along said slot a distance a trifle greater than the thickness of the rivet heads. The rivets are thus held in the position illustrated in Fig. 6 as they slide down toward a distributor block 24. The latter has therein an inclined transverse slot 25 in communication with slot 18 and at right angles thereto. This slot 25 extends entirely across distributor block 24 and has a distributor blade 26 slidable therein. Cylindrical hole 27 in block 24 is bisected by slot 25 and is disposed to one side of slot 18. This hole 27 is of a diameter large enough to clear the heads 20 of the rivets, so that the latter may slide down freely therethrough. The lower end of the inclined hole 27 connects with a vertical extension 27', from which a tubular chute 28 of the same bore as holes 27 and 27' leads downwardly. Block 24 in front and behind slot 25 has short upwardly extending projections 29 which constitute stops for a purpose presently to be described.

Figure 3:
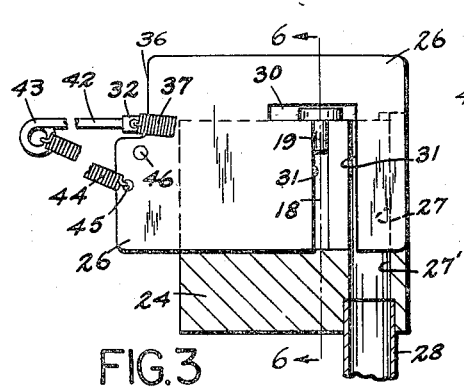
Fig. 3 is a cross-sectional detail view of the distributor mechanism showing the distributor blade at one extreme of its movement.
Figure 4:
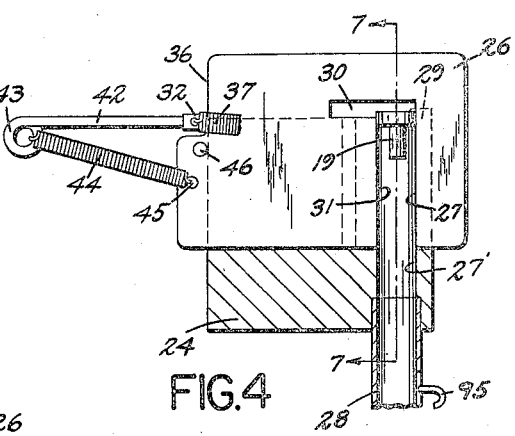
Fig. 4 is a similar view showing the distributor blade at the opposite extreme of its movement.
Figure 5:
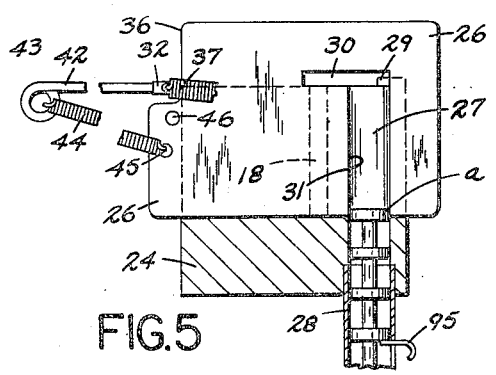
Fig. 5 is a further similar view showing the distributor blade temporarily locked against further movement by the head of a rivet.

Distributor blade 26 is provided with an inverted L-shaped slot having a relatively narrow horizontal portion 30 and a relatively wide vertical portion 31. Portion 30 is wide enough to accommodate the thickness of the rivet heads 20, while the vertical portion 31 is wide enough to accommodate the diameter of the rivet heads. In the position of the distributor blade illustrated in Figs. 4 and 5 the vertical portion 31 of this slot registers with the cylindrical hole 27. When the blade 26 is in the position of Fig. 3 the bottom rivet in the guide block 17 moves down until its shank is received by slot 25, while its head is supported on the top of block 24, as shown in Figs. 3 and 6.

32 is an inclined lever which is pivoted to swing about the shank of a screw 33. At its upper end this lever carries a cam follower 34 running upon a face cam 35. The lower end of lever 32 bears against a notched out face 36 of distributor blade 26, and there is attached to this lever one end of a tension spring 37, the opposite end of which is fastened at 38 to distributor block 24. Spring 37 therefore holds follower 34 against its cam 35 and swings lever 32 counterclockwise when the follower moves down the incline 39 of the cam. Cam 35 is mounted on a shaft 40 which also carries wheel 21 and is rotated at a slow rate of speed by means of a belt 41. A wire arm 42 extends laterally from lever 32 and at its outer extremity is bent into a loop 43 for the reception of one end of another tension spring 44, the opposite end of which is fastened to the distributor blade at 45. A pin 46 is mounted in distributor blade 26 and is adapted to engage one side of distributor block 24 to stop the movement of the blade toward the right, as viewed in Figs. 4 and 5. When the cam 35 causes the lever 32 to swing clockwise, arm 42 causes spring 44 to pull blade 26 toward the left to the position of Fig. 3, motion in this direction being limited by the engagement of the notched face 36 with the lower end of lever 32. Spring 37 is somewhat stronger than spring 44.

Figure 8:
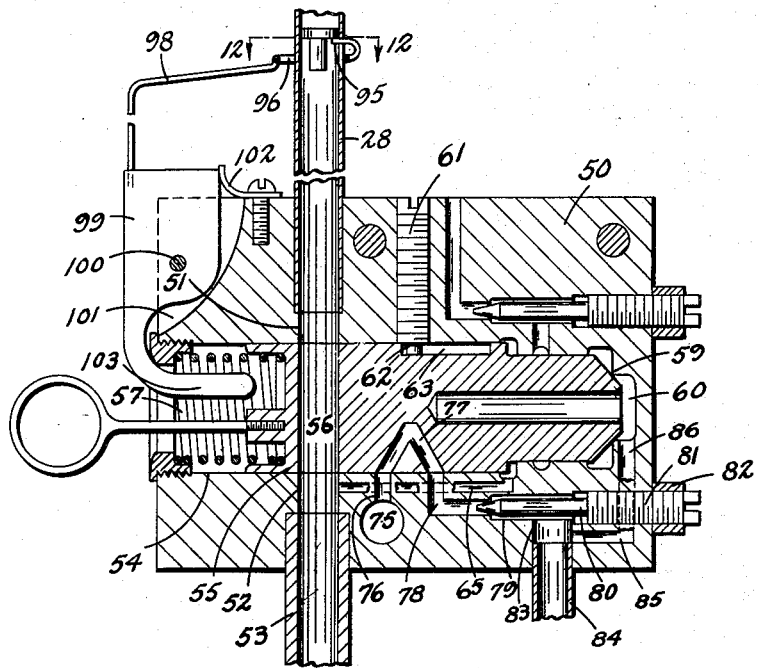
Fig. 8 is a vertical sectional view on a larger scale of a valve mechanism controlling the flow of rivets from a vertical chute into a delivery tube, the valve being open.
Figure 12:
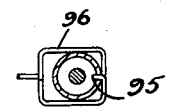
Fig. 12 is a detail sectional view on the line 12—12 of Fig. 8.
Figure 9:
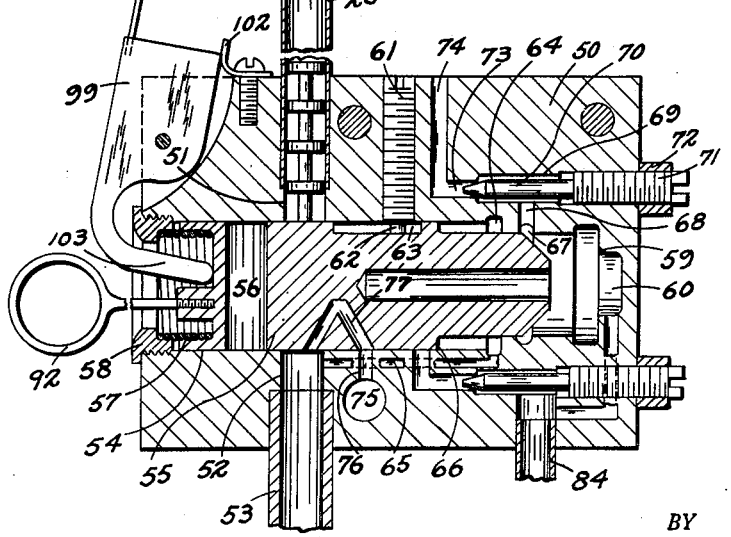
Fig. 9 is a similar view showing the valve closed.

Referring now particularly to Figs. 8 and 9, 50 is a valve chest into the upper part of which tubular chute 28 extends, the latter being concentric with a bore 51. A second bore 52 in the lower part of the valve chest is aligned with bore 51, and a delivery tube 53 socketed in a counterbore of the chest leads downwardly therefrom. The valve chest is provided with a cylindrical valve chamber 54 in which a valve piece 55 is mounted to slide. This valve piece has a bore 56 therethrough of the same diameter as bores 51 and 52 and adapted to be brought into alignment with the latter as shown in Fig. 8. A coil spring 57 bearing at one end against the valve piece and at the other against a threaded bushing 58, tends to hold the valve piece in the position of Fig. 8, where a conoidal surface of the valve piece engages a narrow seat 59 surrounding an end chamber 60 in the valve chest. The valve piece may be prevented from turning by means of a screw 61 having a dog point 62 operating in a longitudinal groove 63 of the valve piece.

The inner end of the valve chamber and the inner end of the valve piece are of a reduced diameter, and where the larger and smaller portions of the valve chamber meet there is an annular chamber 64 surrounding the valve piece. This annular chamber is in communication with bore 52 by way of a passage 65 in the valve chest. An annular shoulder 66 formed at the juncture of the large and small diameter portions of the valve piece, is exposed to whatever pressure exists in the annular chamber 64.

An annular groove 67 formed in the small diameter portion of the valve chamber communicates through a short passage 68 with a passage 69 surrounding a needle valve 70 which may be adjusted by means of a threaded portion 71 and held in adjustment by a lock nut 72. The metered discharge from passage 69 flows through passages 73 and 74 to atmosphere.

75 is an inlet passage for compressed air which may be supplied from a compressed air line or from a compressor situated within the casing 15. A short passage 76 extends from inlet 75 to valve chamber 54. In the valve piece 55 there is a passage 77, shown herein as of inverted V-shape. In the valve position of Fig. 8 this passage 77 connects the inlet with an angular passage 78 leading to a somewhat larger passage 79 which receives a needle valve 80 that is adjustable by means of a threaded portion 81 and is adapted to be locked in adjusted position by a nut 82. The metered air passing needle valve 80 is free to enter a bore 83 with which a tube 84 connects and to flow through passages 85 and 86 into the end chamber 60. In the valve position of Fig. 9 on the other hand passage 77 connects the air inlet 75 with the space at the top of delivery tube 53 and behind any rivets in that tube or a tubular connection 87 which extends into the casing 15 and upward therethrough to a coupling 88 from which a flexible hose 89 extends for conducting the rivets to the desired point of use. Hose 89 may be of much greater length than is illustrated in Fig. 1 and has a rivet chuck 90 at its extremity which, under the control of the operator, is adapted to release the rivets one at a time. Tube 84 extends downwardly through the casing into a storage reservoir 91 into which a considerable volume of pressure fluid must be by-passed before sufficient pressure can be built up in chamber 60 to unseat valve piece 55 against the action of spring 57. For the purpose of facilitating manual operation of the valve piece 55, a ring post 92 may be threadably mounted in the outer end of the valve piece.

After a column of rivets has been fed from chute 28 through bore 56 in the valve to delivery tube 53, it is desirable that further rivets be prevented from descending, as they might become wedged between the valve and the valve chest. Accordingly we provide a finger 95 on a loop 96 which surrounds chute 28 near its upper end, this finger being adapted to move through an opening 97 in the chute into the position illustrated in Fig. 8 where it extends into the path of the next rivet head and dams up any further flow of rivets. This loop 96 is formed integral with a wire 98, the lower end of which is secured in a lever 99 of somewhat unusual shape pivoted at 100 in a slot 101 formed in valve chest 50. A spring 102 tends to hold the lever in the position of Fig. 8. The lower end of lever 99 comprises a lateral projection 103 which extends into the space enclosed by coil spring 57. When valve piece 55 moves to the left, as indicated in Fig. 9, lever 99 swings to the position there illustrated and causes finger 95 to be withdrawn from chute 28, whereupon any rivets then above the finger are permitted to drop until the lowermost one strikes valve piece 55, as also indicated in Fig. 9.

Figure 10:
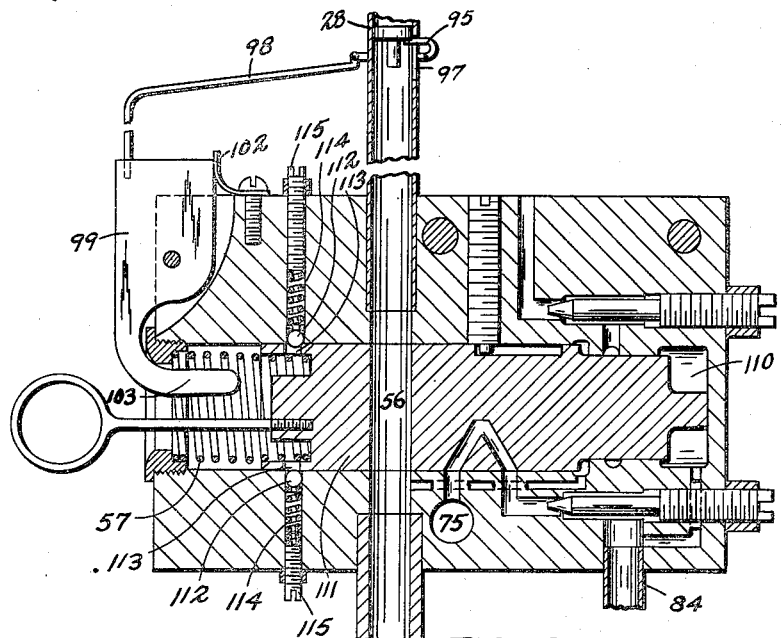
Fig. 10 is a view similar to Fig. 8 of a modified form of valve mechanism, showing the valve open.
Figure 11:
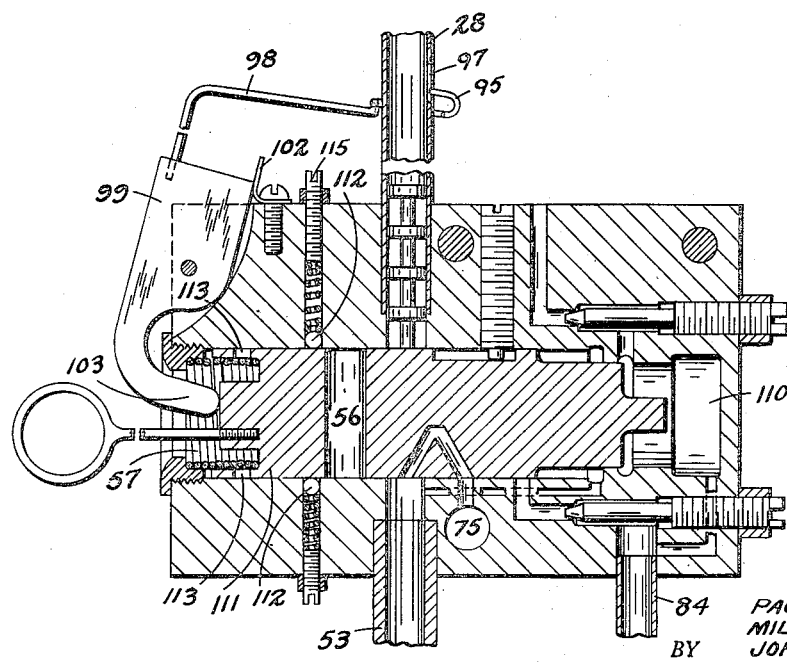
Fig. 11 is a view similar to Fig. 10 but with the valve closed.

In Figs. 10 and 11 we have illustrated a modification of the valve mechanism in which pressure fluid in an end chamber 110 is effective at all times against the major part of the end surface of the valve piece 111. However, in the Fig. 10 position the compression spring 57 is aided in opposing movement of the valve piece toward the left by one or more spring pressed ball detents 112 adapted to engage notches 113 in the valve piece. The forces of the springs 114 of these detents are adjustable by means of the backing screws 115. When pressure builds up in chamber 110 sufficiently to overcome the action of these detents the valve piece will snap over to its Fig. 11 position. In other respects the construction of Figs. 10 and 11 is like that of Figs. 8 and 9, and a further description of the same is unnecessary.

*Operation.*—Assuming that the valve 55 is in the position of Fig. 9, and that a quantity of rivets are present in the hose 89, the delivery tube being connected with the compressed air supply so that pressure is exerted upon the rear end of the column of rivets in the hose, this pressure will be maintained without any material loss inasmuch as the delivery tube is connected with the pressure fluid inlet and inasmuch as any leakage of air must take place around a considerable number of rivets whose heads fit quite closely the inner walls of the hose. The chuck 90 on the free end of the hose is a specially designed chuck having trigger release means for permitting one rivet at a time to be discharged shank foremost. The operator holds the chuck against the work opposite a rivet hole and causes the partly protruding rivet to enter the rivet hole. After this rivet is thus placed in its hole the chuck automatically engages the head of the next rivet and prevents further discharge of rivets until the operator is ready to operate the release means for depositing that rivet in another hole. For a complete disclosure of a chuck suitable for this purpose reference may be had to an application of John H. Engeln, Eugene W. Lehman and Lloyd G. Speth, filed of even date herewith, Serial No. 596,376.

When the supply of rivets in the hose approaches exhaustion, for example when there remain in the hose somewhere in the neighborhood of one-half dozen rivets, the compressed air behind the rivets leaks past them at a rate such that the pressure in the delivery tube is materially reduced. Then, through the passage 65 in the valve piece, the pressure in annular chamber 64 is likewise reduced and the spring 57 starts to expand. As soon as the V passage 77 passes out of communication with passage 76 there is no force whatever to oppose the action of spring 57 and the valve piece then snaps over to the position of Fig. 8. Thereupon all of the rivets that have collected in the chute 28 quickly descend through the bore 56 into the delivery tube 53, while any rivets above finger 95 are cut off.

With each revolution of hopper shaft 40 an additional rivet is moved by blade 26 from a position at the base of guide 17 to a position above cylindrical hole 27 and its extension 27', enabling the rivet to drop through the hole until it strikes the rivet next below. The movement of blade 26 toward the right when the follower 34 moves rapidly to the low spot of cam 35 is rapid because of the strong spring 37 and the left side of the slot 31 in the blade 26, which is in engagement with the shank of the rivet urges the latter toward the right. This movement of the blade is brought to an abrupt stop by the pin 46, but the inertia of the rivet keeps it moving rapidly until its head strikes the projections 29, whereby it is guided into the cylindrical hole 27 with which the wide vertical part 31 of the L-shaped slot is then in register. At this time only a small number of rivets are fed to the chute above the finger 95, because as soon as a rivet falls into the position marked *a* in Fig. 5 the blade 26 is locked against further movement. Jamming of the hopper mechanism is thereby prevented.

With the valve 55 in the Fig. 8 position, live pressure fluid will flow from the inlet 75 through the V passage 77 and angular passage 78, through the needle controlled passage 79 and through passages 83 and 84 to reservoir 91, Fig. 1, and through passages 85 and 86 to end chamber 60. Because of the volume of these passages combined with that of reservoir 91, and because of the metered flow, pressure will build up in chamber 60 somewhat slowly. When it increases sufficiently however, it shifts valve piece 55 to the left away from its seat 59 whereupon a considerably enlarged surface is exposed to the accumulated pressure and the valve piece accordingly snaps over from the position of Fig. 8 to that of Fig. 9. By this valve movement finger 95 is withdrawn from chute 28, the rivets above the finger descend until stopped by the surface of valve piece 55, and the hopper mechanism resumes operation which may continue until the column of rivets in the chute rises to the position *a* of Fig. 5, whereupon its operation is again interrupted.

With the parts in the Fig. 9 position, the pressure fluid at the right hand end of the valve chamber and in the reservoir 91 is gradually dissipated through the annular groove 67 and passages 68, 69, 73 and 74. In the meantime however, inlet 75 is connected through passages 76 and 77 with the interior of the delivery tube, which enables pressure fluid to force the column of rivets in the tube down and into the hose 89 until stopped by the few rivets remaining therein. The pressure then quickly builds up and pressure fluid flows through passage 65 into annular passage 64, where it becomes effective against annular shoulder 66 and serves to hold the valve in the Fig. 9 position. The rivets in the hose prevent appreciable leakage of pressure fluid through the chuck at the end of the hose. When their number is sufficiently reduced and leakage occurs the spring 57 again acts, the parts resume their positions of Fig. 8, and the cycle repeats.

The operation of the machine when the valve mechanism of Figs. 10 and 11 is employed is substantially the same as when the mechanism of Figs. 8 and 9 is used. However the snap action of the valve resulting from the sudden increase of surface exposed to pressure fluid is not present in this form of the invention. The snap action is obtained in this case by the resistance to movement afforded by the ball checks 112. This resistance continues until the notches 113 cam the balls outwardly far enough to enable them to ride on the surface of the valve piece, whereupon the compressed air at the right hand end of the valve snaps the valve piece over from the Fig. 10 position to that of Fig. 11.

Having thus described our invention, we claim:

In a feed mechanism for rivets or the like, a valve chest, a tubular chute for rivets leading to said valve chest, a delivery tube having an internal diameter slightly greater than the diameter of the rivet heads leading from said chest in alignment with said chute, a valve piece in said chest, a spring at one end of said chest tending to move said valve piece into a first position for connecting said chute and delivery tube, said valve chest having a chamber at its opposite end exposed to the adjacent end of said valve piece and an annular chamber exposed to an annular surface of the valve piece, a storage reservoir in communication with said end chamber, means effective when said valve piece is in said first position for building up pressure in said end chamber and said reservoir for moving said valve piece to a second position disconnecting the chute and delivery tube, means effective in said second position for slowly dissipating the pressure in said end chamber and reservoir, and means effective in said second position for introducing and maintaining pressure fluid in said delivery tube behind the column of rivets therein, said valve chest having therein a passage connecting said delivery tube and said annular chamber, whereby pressure fluid is admitted to the annular surface of the valve piece to maintain it in its second position as long as the supply of rivets in said delivery tube prevents appreciable leakage therefrom, which leakage will cause escape of the pressure fluid from said annular surface and the consequential shifting of the valve in its first position.

PAUL VAN SITTERT.
MILTON J. GARRETT.
JOHN H. ENGELN.

REFERENCES CITED

The following references are of record in the file of this patent:

UNITED STATES PATENTS

| Number | Name | Date |
|---|---|---|
| 323,081 | Smith | July 28, 1885 |
| 380,645 | Dean | Apr. 3, 1888 |
| 1,191,180 | Havener | July 18, 1916 |
| 1,618,367 | Dick | Feb. 22, 1927 |
| 1,651,976 | Stimpson | Dec. 6, 1927 |
| 1,703,458 | Ruff | Feb. 26, 1929 |
| 1,980,967 | Mooy | Nov. 13, 1934 |
| 2,010,165 | Tear | Aug. 6, 1935 |
| 2,017,500 | Hood | Oct. 15, 1935 |
| 2,056,559 | Berliner | Oct. 6, 1936 |
| 2,311,251 | Rees | Feb. 16, 1943 |
| 2,330,052 | Henry | Sept. 21, 1943 |
| 2,340,552 | Mortl | Feb. 1, 1944 |
| 2,341,014 | Blair | Feb. 8, 1944 |